US012710018B2

(12) United States Patent
Avison

(10) Patent No.: US 12,710,018 B2
(45) Date of Patent: *Aug. 18, 2026

(54) POWER GENERATION SYSTEM

(71) Applicant: Landmark Technology Limited, Fulham (GB)

(72) Inventor: Michael Avison, London (GB)

(73) Assignee: Landmark Technology Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 19/059,795

(22) Filed: Feb. 21, 2025

(65) Prior Publication Data

US 2025/0198364 A1 Jun. 19, 2025

Related U.S. Application Data

(63) Continuation of application No. 18/720,149, filed as application No. PCT/EP2022/085897 on Dec. 14, 2022, now Pat. No. 12,234,789.

(30) Foreign Application Priority Data

Dec. 16, 2021 (GB) ...................................... 2118285

(51) Int. Cl.
*F02G 5/04* (2006.01)

(52) U.S. Cl.
CPC ............ *F02G 5/04* (2013.01); *F05D 2220/76* (2013.01); *F05D 2260/213* (2013.01)

(58) Field of Classification Search
CPC .......... F02G 5/04; F02G 5/02; F05D 2220/76; F05D 2260/213; F01K 23/10; F01K 23/065; F01K 23/06; F01K 23/08; F01N 5/02; F01N 5/04
USPC .......................................... 60/597, 616, 618
See application file for complete search history.

(56) References Cited

U.S. PATENT DOCUMENTS 4,899,544 A 2/1990 Boyd
10,384,525 B2 8/2019 Franke
11,070,064 B2 7/2021 Batsch-Smith
12,234,789 B1 * 2/2025 Avison .................. F01K 23/065
(Continued)

FOREIGN PATENT DOCUMENTS

GB 2551818 A 1/2018
GB 2613844 12/2023
(Continued)

OTHER PUBLICATIONS

Avison, Michael; Communication pursuant to Article 94(3) EPC for Application No. 22838751.0, filed Dec. 14, 2022, mailed Jul. 21, 2025, 9 pgs.

(Continued)

*Primary Examiner* — Hoang M Nguyen
(74) *Attorney, Agent, or Firm* — Smith, Gambrell & Russell, LLP

(57) ABSTRACT

The power generation system includes at least one combustion engine. The power generation system further includes a power generation arrangement that is constructed and arranged to generate electricity from waste energy from the at least one combustion engine. The power generation arrangement includes an electro-turbo compounding engine; a high temperature turbine engine; and a low temperature turbine engine.

19 Claims, 6 Drawing Sheets

(56) References Cited

U.S. PATENT DOCUMENTS

| | | | | |
|---|---|---|---|---|
| 2008/0104958 | A1* | 5/2008 | Finkenrath | B01D 53/00 60/602 |
| 2009/0031724 | A1* | 2/2009 | Ruiz | F01K 13/02 60/661 |
| 2009/0121495 | A1 | 5/2009 | Mills | |
| 2009/0314005 | A1 | 12/2009 | Messmer | |
| 2010/0011766 | A1 | 1/2010 | Gründl et al. | |
| 2012/0317973 | A1 | 12/2012 | Gülen | |
| 2013/0186086 | A1 | 7/2013 | Sarby | |
| 2016/0146161 | A1* | 5/2016 | Sun | F01N 3/021 60/311 |
| 2016/0376021 | A1 | 12/2016 | Ullyott et al. | |
| 2020/0173311 | A1 | 6/2020 | Dowman-tucker | |
| 2020/0208574 | A1 | 7/2020 | Sinatov | |
| 2021/0108540 | A1 | 4/2021 | Kato et al. | |
| 2025/0043748 | A1 | 2/2025 | Avison | |

FOREIGN PATENT DOCUMENTS

| | | | |
|---|---|---|---|
| JP | H1089017 | A | 4/1998 |
| JP | 2006214320 | A | 8/2006 |
| WO | WO2023111040 | | 6/2023 |

OTHER PUBLICATIONS

Avison, Michael; Examination Report for United Kingdom patent application No. GB2118285.2, mailed Nov. 25, 2022, 5 pgs.

Avison, Michael; Examination Report for United Kingdom patent application No. GB2118285.2, mailed Jun. 10, 2022, 7 pgs.

Avison, Michael; International Search Report and Written Opinion for PCT/EP2022/085897, filed Dec. 14, 2022, mailed Mar. 30, 2023, 14 pgs.

Avison, Michael; Notice of Allowance for U.S. Appl. No. 18/720,149, filed Jun. 14, 2024 mailed Nov. 26, 2024, 16 pgs.

* cited by examiner

POWER GENERATION SYSTEM

CROSS-REFERENCE TO RELATED APPLICATIONS

This application is a continuation of U.S. patent application Ser. No. 18/720,149, filed Jun. 14, 2024, which is a U.S. National Phase Entry under 35 U.S.C. § 371 of PCT/EP2022/085897, filed Dec. 14, 2022, which claims priority to GB Application No. 2118285.2, filed Dec. 16, 2021, each of which is hereby incorporated by reference herein in its entirety.

TECHNICAL FIELD

The present disclosure relates to a power generation systems, for example power generation systems for producing electricity to be fed into an electricity grid.

BACKGROUND

Power generation systems are known. Various governments have made ambitious commitments to reduce carbon emissions. For example, the UK government has made a commitment to reduce carbon emissions to "net zero" by 2050. Whilst renewable energy will play a large role in achieving that aim, so will improving the efficiency of combustion-based power generation systems.

SUMMARY

According to a first aspect there is provided: a power generation system comprising: at least one combustion engine; a power generation arrangement that is constructed and arranged to generate electricity from waste energy from the at least one combustion engine; and wherein the power generation arrangement comprises: an electro-turbo compounding engine; a high temperature turbine engine; and a low temperature turbine engine.

According to some examples, each of the electro-turbo compounding engine; the high temperature turbine engine; and the low temperature turbine engine can be switched on and off independently of each other.

According to some examples, the electro-turbo compounding engine is constructed and arranged to be driven by kinetic and/or thermal energy from the at least one combustion engine.

According to some examples, the high temperature turbine engine is constructed and arranged to be driven by flue gas from the at least one combustion engine.

According to some examples, the system comprises a heat exchanger fluidly connected to the high temperature turbine, wherein the flue gas enters the heat exchanger at about 380° C.

According to some examples, the low temperature turbine engine is constructed and arranged to be driven by water heated from the at least one combustion engine.

According to some examples, the water enters the low temperature turbine engine at about 90° C. to 120° C.

According to some examples, the at least one combustion engine comprises two or more combustion engines.

According to some examples, at any one time, at least one of the two or more combustion engines is switched off and at least one of the two or more combustion engines is switched on.

According to some examples, the at least one combustion engine comprises four combustion engines, and at any one time at least one of the combustion engines is switched on.

According to some examples, at any one time three of the combustion engines are switched on and one of the combustion engines is switched off.

According to some examples, the system comprises at least one electricity generator driven by the at least one combustion engine.

According to some examples, an output shaft of the at least one combustion engine is operatively connected to both the electricity generator driven by the at least one combustion engine and one of: an input shaft of the electro-turbo compounding engine; an input shaft of the high temperature turbine engine; an input shaft the low temperature turbine engine.

According to some examples, an output shaft of the at least one combustion engine is operatively connected to both the electricity generator driven by the at least one combustion engine and an input shaft of the low temperature turbine engine.

According to some examples, the system comprises a clutch for selectively transmitting drive from the output shaft of the at least one combustion engine to the input shaft of the low temperature turbine engine.

According to some examples, the clutch is arranged to transmit drive from the output shaft of the at least one combustion engine to the input shaft of the low temperature turbine engine, when an operating temperature of the low temperature turbine engine is reached.

According to some examples the system comprises: an electricity generator driven by the electro-turbo compounding engine; an electricity generator driven by the high temperature turbine engine; and an electricity generator driven by the low temperature turbine engine.

According to some examples, the system comprises an emissions unit for handling emissions from the system.

According to some examples, the emissions unit comprises a carbon capture unit.

According to some examples, the carbon capture unit is constructed and arranged to output one or more of: food-grade carbon dioxide; carbon black.

According to some examples, the emissions unit comprises a carbon-oxygen separation unit which is constructed and arranged to receive below food-grade carbon dioxide from the carbon capture unit, and to provide oxygen and carbon black as an output.

According to some examples, the emissions unit comprises a NOx/SOx cleaner.

According to some examples, the system is controlled by a control system.

According to some examples, the power generation system is arranged to output electrical power to an electrical grid.

According to an aspect there is provided a power generation system comprising: two or more combustion engines; a power generation arrangement that is constructed and arranged to generate electricity from waste energy from the two or more combustion engines; and wherein the power generation arrangement comprises: an electro-turbo compounding engine; a high temperature turbine engine; and a low temperature turbine engine; wherein each of the electro-turbo compounding engine; the high temperature turbine engine; and the low temperature turbine engine can be switched on and off independently of each other; and wherein the power generation system comprises an emissions handling unit, the emissions handling unit comprising a carbon capture unit.

DETAILED DESCRIPTION

Promotion of renewable energy has been a cornerstone of policy in reducing carbon emissions. However, there are some drawbacks with renewables. For example, renewable power sources have their own carbon footprint from the construction and installation of infrastructure, which is often greater than the carbon footprint of constructing (or maintaining) a traditional power plant. The energy supply from renewables is also insecure. For example, changing weather conditions cause fluctuations in generation output. Also, there is a lack of inertia from renewable energy supplies, which contrasts with the spinning momentum that provides system stability when a large power station goes off-line unexpectedly.

Considering these drawbacks, the present disclosure identifies that non-renewable power generation (such as gas-powered generation) is vital to complement the growth of renewables. Moreover, the present disclosure identifies that gas-powered generation can be accompanied by emissions handling such as carbon capture techniques, to comply with tightening emissions standards.

Therefore, in overview, the present disclosure relates to energy production using non-renewable sources, with improved efficiency. The present disclosure also discloses ways of capturing and cleaning the waste products from a combustion engine. The disclosed system complements the growth in renewables and helps to ensure there is sufficient supply to meet demand by at least: balancing the fluctuating output from intermittent renewable generation; support system stability by providing inertia in the grid; relieving stress on local and national power networks through dynamic, flexible generation providing additional power when it is needed. The result is dependable, clean energy that helps the UK and other countries meet their energy targets, and assists with the production of industrial grade $CO_2$.

Figure 1:
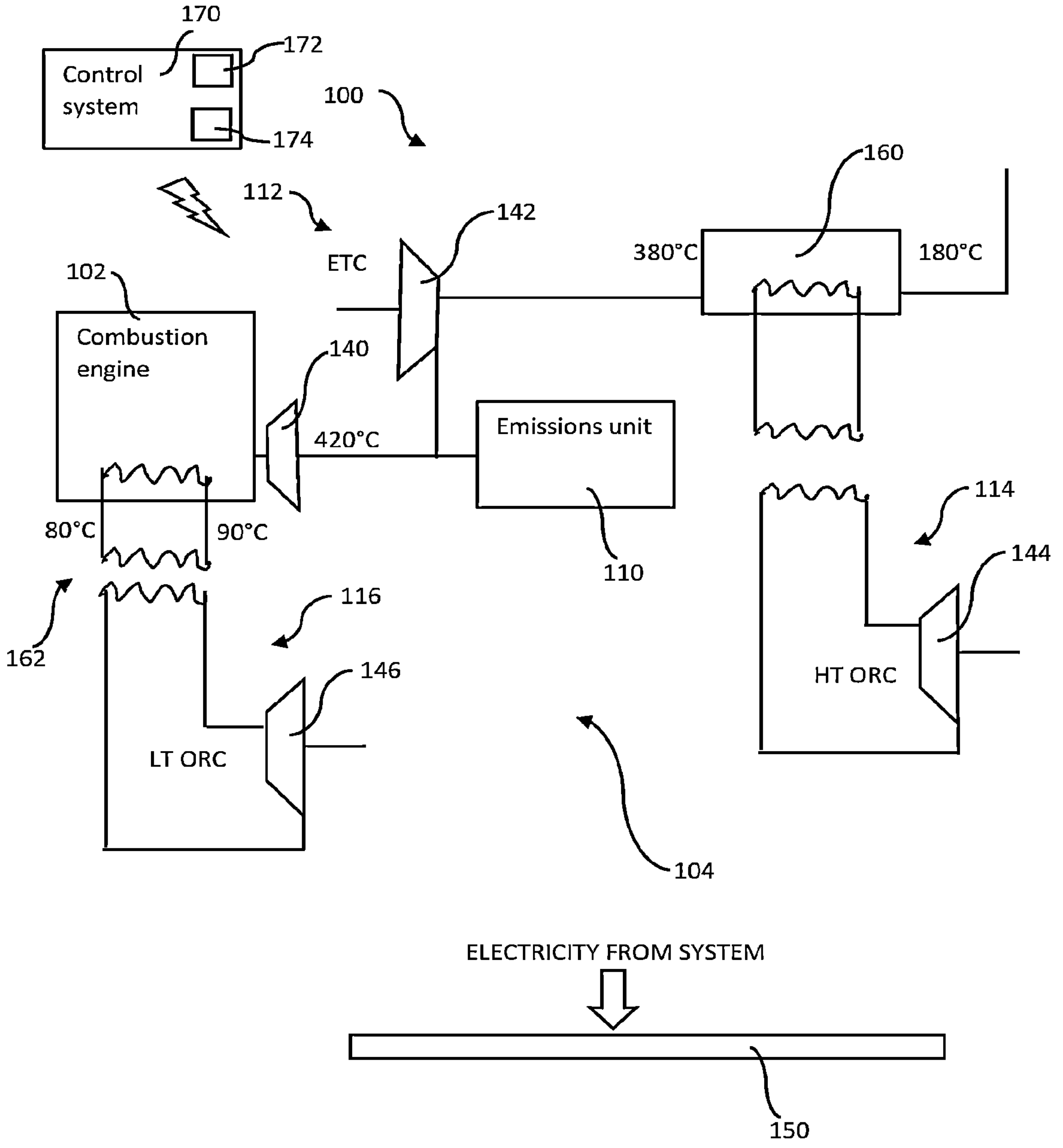
FIG. 1 schematically shows a power generation system according to an example.

An overview of a proposed system, according to an example, is shown with respect to FIG. 1.

The power generation system 100 comprises at least one combustion engine 102. According to some examples, the combustion engine 102 comprises a fossil fuel powered combustion engine. According to some examples, the combustion engine 102 is a gas-fired reciprocating engine. By way of example, the at least one combustion engine 102 comprises a Rolls Royce® MTU engine. For example, the MTU 20V4000 GS engine may be used. The at least one combustion engine 102 may be considered a base load generator. The at least one combustion engine 102 powers an electricity generator turbine shown schematically at 140. Electricity converted by generator 140 can be fed into an electrical grid shown schematically at 150. For example, grid 150 may comprise the National Grid.

A power generation arrangement is shown schematically at 104. The power generation arrangement 104 is constructed and arranged to generate electricity from waste energy from the at least one combustion engine 102. For example, the waste energy may comprise waste heat and/or kinetic energy. For example, the at least one combustion engine 102 may be considered a primary generator of electricity, and the power generation arrangement 104 is considered to be a secondary generator of electricity.

As shown in FIG. 1, the power generation arrangement 104 comprises an electro-turbo compounding engine (ETC) 112; a high temperature turbine engine 114; and a low temperature turbine engine 116.

According to some examples, the ETC comprises a Bowman® (www.bowmanpower.com) ETC.

According to some examples, the high temperature turbine engine 114 comprises a high temperature organic Rankine cycle engine (HT ORC). For example, the high temperature turbine engine 114 may comprise a HT ORC provided by Turboden® (www.turboden.com). In some examples the high temperature turbine engine 114 may operate at inlet temperature of over 300° C. In some examples, inlet temperature may be 380° C. or about 380° C., or higher.

According to some examples, the low temperature turbine engine 116 comprises a low temperature organic Rankine cycle engine (LT ORC). For example, the low temperature turbine engine 116 may comprise a LT ORC provided by Climeon® (www.climeon.com). In some examples, the inlet temperature of the low temperature turbine engine 116 is in a range of about 80° C. to about 120° C. In some examples, inlet temperature of the low temperature turbine engine 116 is 90° C. or about 90° C.

Generally speaking, it will be understood that the high temperature turbine engine 114 is arranged to operate at a first temperature, and the low temperature turbine engine is arranged to operate at a second temperature. The first temperature is higher than the second temperature. Thus, in some examples the high temperature turbine engine 114 may be considered a first-temperature turbine engine 114, and the low temperature turbine engine 116 may be considered a second-temperature turbine engine 116, where the second temperature is lower than the first temperature.

According to some examples, the ETC engine 112 is constructed and arranged to be driven by kinetic and/or and thermal energy from the at least one combustion engine 102. For example, kinetic energy from the flow of engine exhaust gases from the combustion engine 102 may be captured by the ETC 112. For example, heat may enter the ETC at 420° C. or about 420° C. ETC comprises an electrical generator shown schematically at 142. Electricity converted by generator 142 can be fed into grid 150. The incorporation of the ETC 112 into the system 100 produces a net efficiency increase for the system 100 due to the increase in total electrical output without any additional fuel input.

According to some examples, the high temperature turbine engine 114 is constructed and arranged to be driven by flue gas from the at least one combustion engine 102. According to some examples, a heat exchanger 160 is fluidly connected to the high temperature turbine 114. In some examples, the flue gas enters the heat exchanger 160 at about 380° C. In some examples, flue gas exits the heat exchanger at about 180° C.

The high temperature turbine engine 114 comprises an electrical generator turbine shown schematically at 144. Electricity converted by generator 144 can be fed into grid 150. In some examples the high temperature turbine engine 114 contributes up to 10% extra power and increases system efficiency to over 50%, by utilising waste heat in the exhaust gases of the combustion engine 102.

According to some examples, the low temperature turbine engine 116 is constructed and arranged to be driven by heat energy from the combustion engine 102. For example, the heat energy may be captured in the form of hot water heated by the at one combustion engine 102. According to some examples, the hot water is fed via a heat exchanger or engine cooling jacket 162. According to some examples, water enters the low temperature turbine engine (via heat exchanger 162) at a temperature of about 90° C. to 120° C. According to some examples, the water then re-enters the heat exchanger 162 at a temperature of about 80° C. This can additionally provide cooling to combustion engine 102, to improve efficiency. Use of waste heat from the combustion engine 102 contributes additional power without increased fuel consumption. In some examples, the combustion engine 102 has a thermal output of 1411 kWt, from which the LT ORC 116 can produce 85 to 116 kWe, depending on the ambient temperature. This may equate to a 3.4 to 4.5% increase in overall power output from the combustion engine 102 with no increase in fuel demand.

The low temperature turbine engine 116 comprises an electrical generator turbine shown schematically at 146. Electricity converted by generator 146 can be fed into grid 150.

According to some examples, each of the electro-turbo compounding engine 112; the high temperature turbine engine 114; and the low temperature turbine engine 116 can be switched on and off independently of each other. This enables maintenance of individual elements without having to completely shut down power generation arrangement 104.

The combination of the combustion engine 102, with ETC 112; high temperature turbine engine 114; and low temperature turbine engine 116; all feeding electricity in to grid 150, is considered to provide improved efficiency over known power generation system arrangements.

According to some examples, one or more of the ETC 112; high temperature turbine engine 114; and low temperature turbine engine 116 is provided in a modular fashion, for example on skids or in a container. This means they can be added/retrofitted to the system 100 in a plug-and-play fashion.

According to some examples, the at least one combustion engine 102 comprises two or more combustion engines. According to some examples, at any one time at least one of the two or more combustion engines is switched off and at least one of the two or more combustion engines is switched on. This introduces a level of redundancy in the system. For example, one combustion engine can be taken off-line for maintenance whilst the system 100 can still run effectively via the at least one combustion engine that is still switched on.

According to some examples, the at least one combustion engine comprises four combustion engines, and at any one time at least one of the combustion engines is switched on. According to some examples, at any one time one combustion engine is switched off while three combustion engines remain running.

According to some examples, each combustion engine comprises a 2.5 MW engine. Therefore, where four combustion engines are used, that provides a 10 MW plant.

According to some examples, the at least one combustion engine 102 is referred to as a base generator. According to some examples, each of the ETC 112, the high temperature turbine engine 114, and the low temperature turbine engine 116 may be referred to as downstream elements.

According to some examples, the system comprises an emissions handling unit 110 for handling emissions from the system 100. Emissions handling unit 110 may also be referred to as a Stack Gas Recovery (SGR) unit. In some examples, the emissions handling unit 110 is constructed and arranged to handle emissions from the at least one combustion engine 102. According to some examples, the emissions unit is also constructed and arranged to handle emissions from any one or more of: ETC 112; high temperature turbine engine 114; low temperature turbine engine 116.

In some examples, the emissions are drawn into emissions unit 110 by an induced draught fan. In some examples, a diverter damper or valve can be used to divert the exhaust gases to the emissions handling unit 110. The emissions handling unit 110 is described in more detail with respect to FIG. 2.

Figure 2:
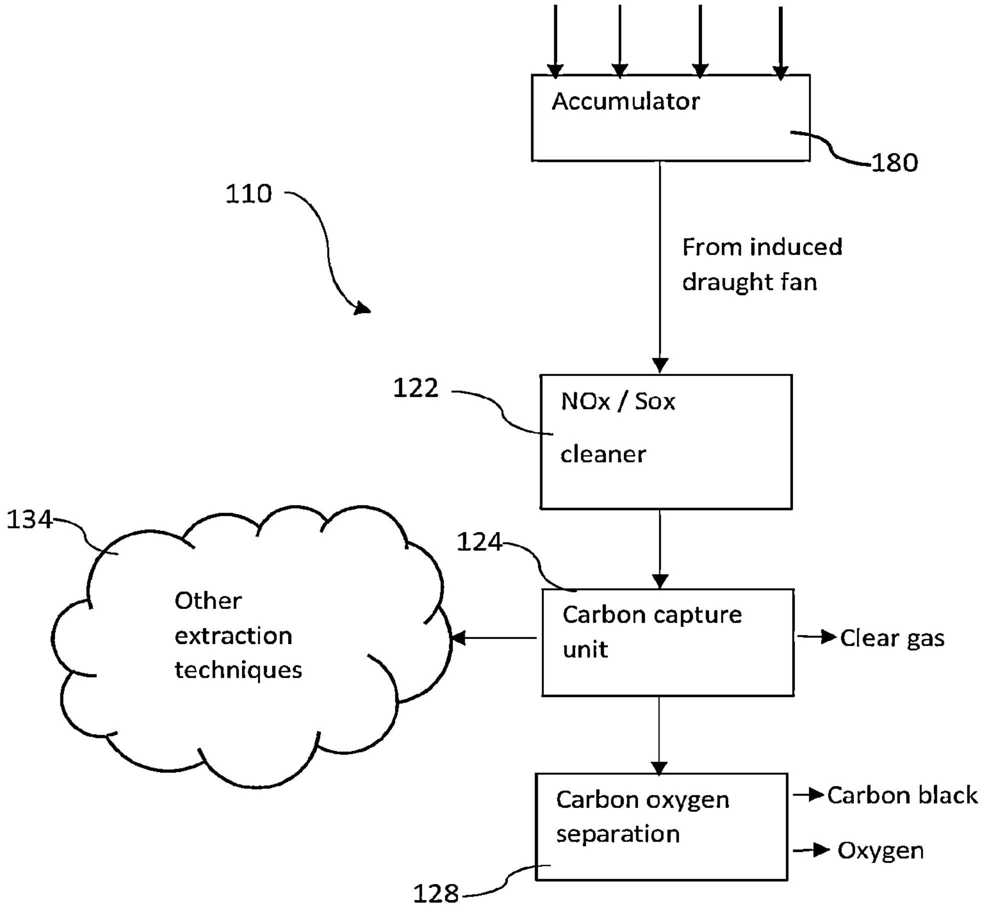
FIG. 2 schematically shows an emissions handling system according to an example.

As shown in FIG. 2, the emissions unit 110 comprises an accumulator 180. The accumulator 180 is constructed and arranged to accumulate flue gases. The accumulated flue gases can then be homogenised in the accumulator 180, before being output from the accumulator 180. For example, an induced draught fan may draw the homogenised flue gases away from the accumulator 180. Accumulating and homogenising the flue gases may, for example, homogenise temperature and/or composition of the flue gases. This makes the temperature and/or composition of the accumulated flue gases more predictable, and downstream components can then be optimised to deal with the flue gases. This may improve carbon capture performance. Overall, this may improve efficiency of the system. In examples, the flue gases drawn in to the accumulator 180 may be drawn from one or more of: at least one combustion engine 102; ETC 112; high temperature turbine engine 114; low temperature turbine engine 116.

As shown in FIG. 2, the emissions unit 110 comprises a NOx/SOx cleaner 122. In some examples, up to 99% of NOx is removed by the cleaner 122. In some examples, the exhaust gas is first cooled before entering the NOx/SOx cleaner 122.

According to some examples, the emissions unit comprises a carbon capture unit 124. The carbon capture unit is arranged to capture carbon. In some examples, carbon capture unit 124 is arranged to capture carbon from carbon dioxide. According to some examples, carbon capture unit 124 is arranged to output one or more of: food grade carbon dioxide; carbon black. According to some examples, the food grade carbon dioxide can be bottled and then provided to users of carbon dioxide e.g. the beverage industry.

According to some examples, the emissions unit 110 comprises carbon-oxygen separation unit 128. According to some examples, the carbon-oxygen separation unit 128 is constructed and arranged to receive below food-grade carbon dioxide from the carbon capture unit 124, and to provide oxygen and carbon black as an output.

Overall, about 90 to 95% of carbon emitted by one or more combustion engines 102 can be removed/captured.

According to some examples, each of the components of the emissions handling unit 110 (e.g. NOx/SOx cleaner 122; carbon capture unit 124; carbon oxygen separation unit 128) is skid mounted. This means they can be constructed in a factory and then transported to site for easy installation, for example in a plug-and-play fashion.

In some examples, the presence of the emissions handling unit 110 enables the at least one combustion engine 102 to be operated at a relatively high temperature (for example, higher than would typically be used without emissions handling). This is because any increased carbon dioxide output caused by the higher operational temperatures of the at least one combustion engine 102 is captured downstream in the emissions handling unit 110. Running the at least one combustion engine 102 at higher temperatures may increase electrical output from the downstream generators.

Some alternative arrangements for the layout of system 100 are shown in FIGS. 3 to 6. Elements that correspond to the system 100 are shown with equivalent reference numerals, but in 300 series (for FIG. 3) rather than 100 series. For example, at least one combustion engine 300 in FIG. 3 may be considered equivalent to at least one combustion engine 100 in FIG. 1, and so-on for FIGS. 4 to 6. Elements of FIG. 1 and FIG. 2 can be combined with elements of FIGS. 3 to 6, unless explained otherwise. For example, the system of FIGS. 3 to 6 may comprise two or more combustion engines. For example, the system of FIGS. 3 to 6 may comprise a power generation arrangement that comprises: an electro-turbo compounding engine; a high temperature turbine engine; and a low temperature turbine engine. However, for concise explanation of some further concepts, not all features from FIGS. 1 and 2 are shown in FIGS. 3 to 6.

Figure 3:
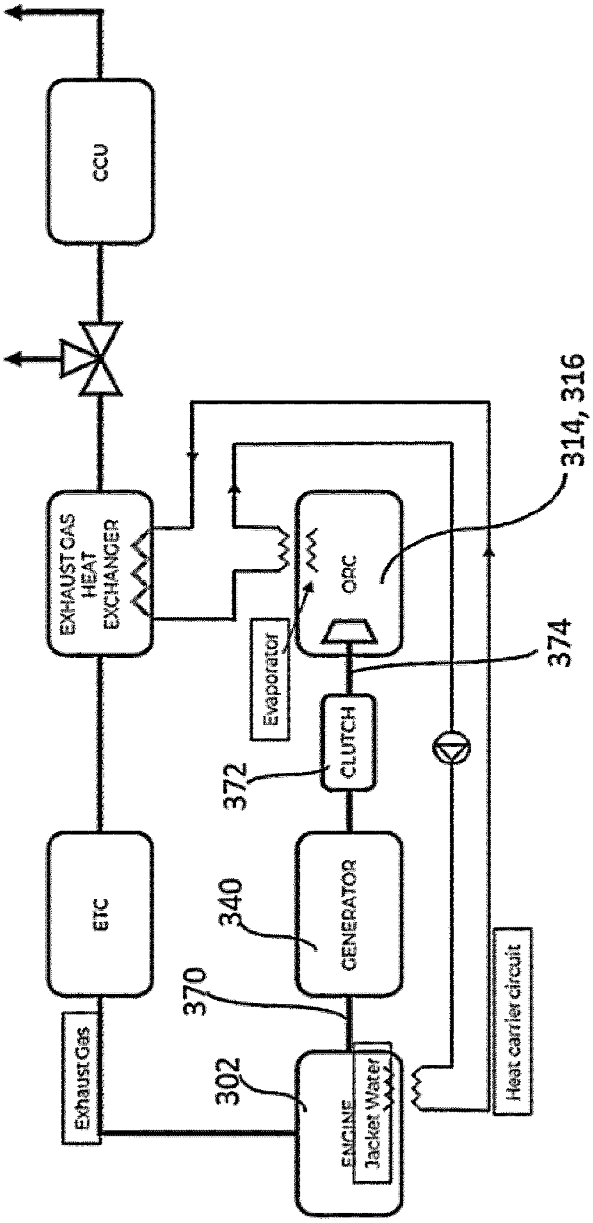
FIG. 3 schematically shows a power generation system according to an example.

Turning to FIG. 3, the at least one combustion engine 300 powers electrical generator 340 via an output shaft 370. This output shaft 370 extends through generator 340 to clutch 372. The clutch 372 is constructed and arranged to selectively transmit drive from output shaft 370 to an input shaft 374 of turbine engine 314, 316. In some examples, turbine engine 314, 316 comprises a high temperature turbine engine 314. In some examples, turbine engine 316 comprises low temperature turbine engine 316. According to some examples it will be considered that the shaft 370 and shaft 374 extend in a straight line, or along a same axis, from output of combustion engine 302 to input of turbine engine 314, 316. In some examples, the system is arranged to cause the clutch 372 to engage shaft 374 (i.e. begin transmitting drive from shaft 370 to shaft 374) once the turbine is hot or up to operating temperature and the turbine 314, 316 is spinning at a speed that matches the speed of the engine 302. This arrangement, i.e. output shaft 370 of engine 302 driving input shaft 374 of turbine 314, 316 via clutch 372, further improves efficiency of the system.

The same principle applies in FIGS. 4 to 6, explained below for completeness.

Figure 4:
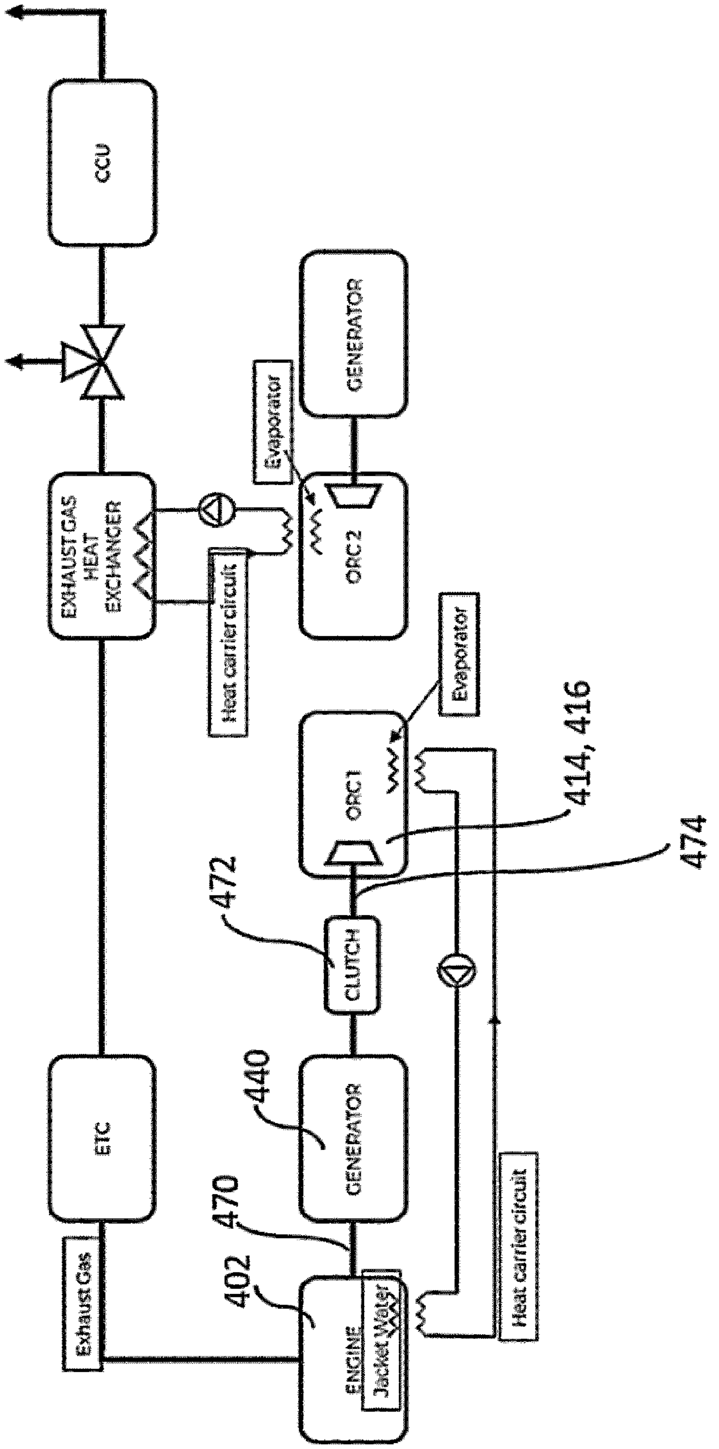
FIG. 4 schematically shows a power generation system according to an example.

Turning to FIG. 4, the at least one combustion engine 400 powers electrical generator 440 via an output shaft 470. This output shaft 470 extends through generator 440 to clutch 472. The clutch 472 is constructed and arranged to selectively transmit drive from output shaft 470 to an input shaft 474 of turbine engine 414, 416. In some examples, turbine engine 414, 416 comprises a high temperature turbine engine 414. In some examples, turbine engine 416 comprises low temperature turbine engine 416. According to some examples it will be considered that the shaft 470 and shaft 474 extend in a straight line, or along a same axis, from output of combustion engine 402 to input of turbine engine 414, 416. In some examples, the system is arranged to cause the clutch 472 to engage shaft 474 (i.e. begin transmitting drive from shaft 470 to shaft 474) once the turbine is hot or up to operating temperature and the turbine 414, 416 is spinning at a speed that matches the speed of the engine 402.

This arrangement, i.e. output shaft 470 of engine 402 driving input shaft 474 of turbine 414, 416 via clutch 472, further improves efficiency of the system.

Figure 5:
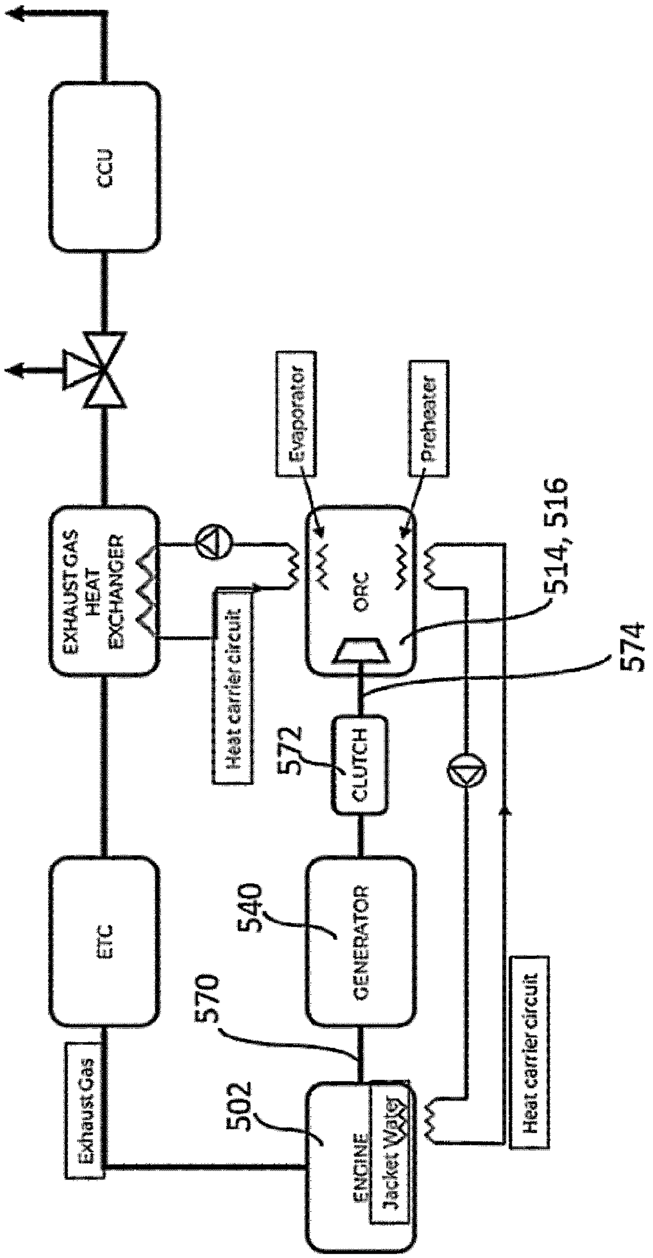
FIG. 5 schematically shows a power generation system according to an example.
Figure 6:
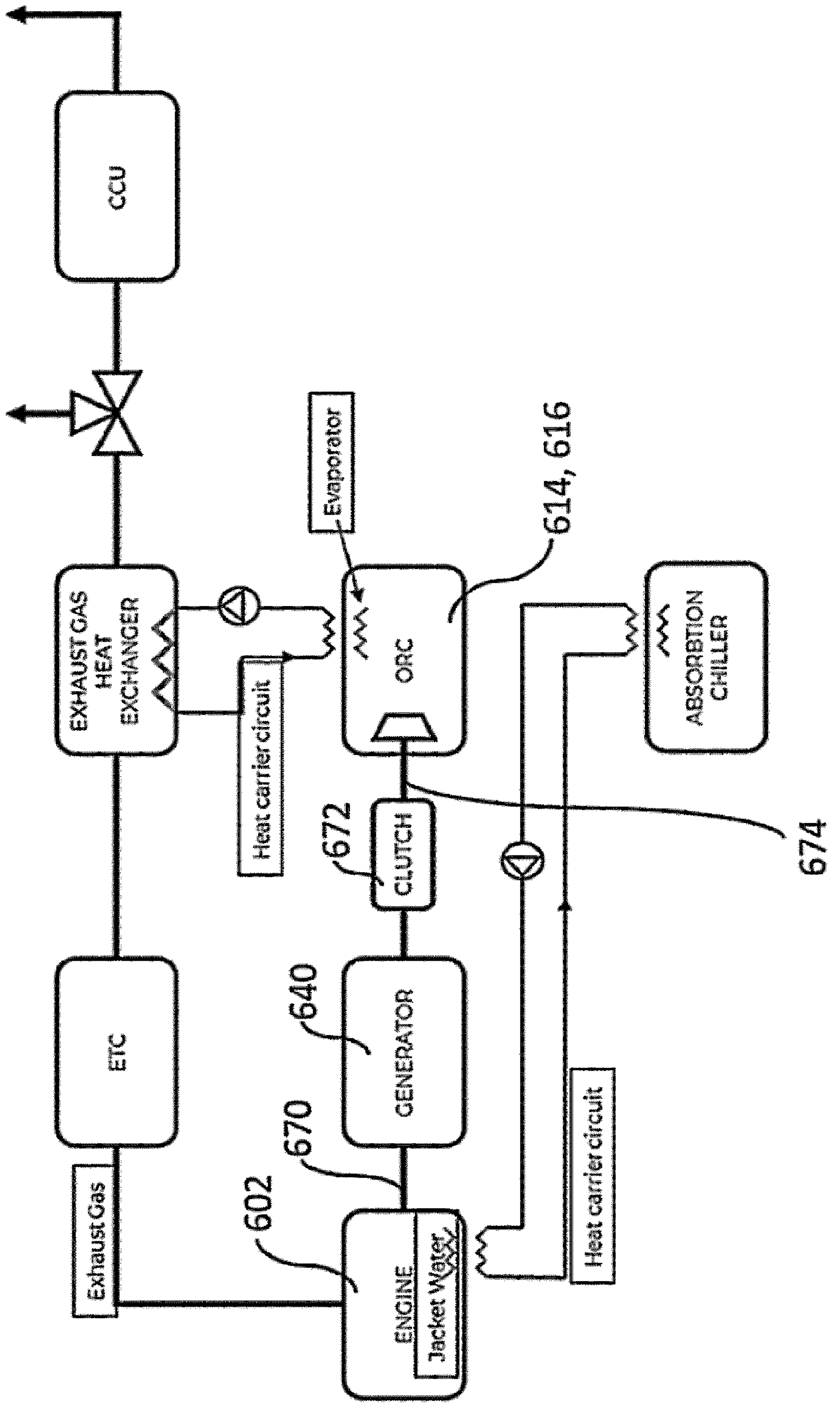
FIG. 6 schematically shows a power generation system according to an example.

Turning to FIG. 5, the at least one combustion engine 500 powers electrical generator 540 via an output shaft 570. This output shaft 570 extends through generator 540 to clutch 572. The clutch 572 is constructed and arranged to selectively transmit drive from output shaft 570 to an input shaft 574 of turbine engine 514, 516. In some examples, turbine engine 514, 516 comprises a high temperature turbine engine 514. In some examples, turbine engine 516 comprises low temperature turbine engine 516. According to some examples it will be considered that the shaft 570 and shaft 574 extend in a straight line, or along a same axis, from output of combustion engine 502 to input of turbine engine 514, 516. In some examples, the system is arranged to cause the clutch 572 to engage shaft 574 (i.e. begin transmitting drive from shaft 570 to shaft 574) once the turbine is hot or up to operating temperature and the turbine 514, 516 is spinning at a speed that matches the speed of the engine 502. This arrangement, i.e. output shaft 570 of engine 502 driving input shaft 574 of turbine 514, 516 via clutch 572, further improves efficiency of the system Turning to FIG. 6, the at least one combustion engine 600 powers electrical generator 640 via an output shaft 670. This output shaft 670 extends through generator 640 to clutch 672. The clutch 672 is constructed and arranged to selectively transmit drive from output shaft 670 to an input shaft 674 of turbine engine 614, 616. In some examples, turbine engine 614, 616 comprises a high temperature turbine engine 614. In some examples, turbine engine 616 comprises low temperature turbine engine 616. According to some examples it will be considered that the shaft 670 and shaft 674 extend in a straight line, or along a same axis, from output of combustion engine 602 to input of turbine engine 614, 616. In some examples, the system is arranged to cause the clutch 672 to engage shaft 674 (i.e. begin transmitting drive from shaft 670 to shaft 674) once the turbine is hot or up to operating temperature and the turbine 614, 616 is spinning at a speed that matches the speed of the engine 602. This arrangement, i.e. output shaft 670 of engine 602 driving input shaft 674 of turbine 614, 616 via clutch 672, further improves efficiency of the system.

In some examples, similar arrangements to FIGS. 3 to 6 could also be used for providing selective drive to an input shaft of ETC.

Table 1 below provides a comparison between a standard peaking power or "peaker" plant (first column); against a plant configuration or system 100 as disclosed in the present application, not including emissions handling unit 110 (second column); and a plant configuration or system 100 as disclosed in the present application, including the emissions handling unit 110 (third column). In some examples, the system 100 disclosed in the present application is referred to as "flex-power plus" (FPP).

TABLE 1

| | 10 MW standard peaker | 10 MW FPP (fuel save mode) | 10 MW FPP (with emissions handling) |
|---|---|---|---|
| Input kWt | 23,130 | 19,430 | 19,430 |
| Output kWe | 10,000 | 10,000 | 10,250 |
| Engine | Yes | Yes | Yes |
| ETC | No | Yes | Yes |
| HT ORC | No | Yes | Yes |
| LT ORC | No | Yes | Yes |

TABLE 1-continued

| | 10 MW standard peaker | 10 MW FPP (fuel save mode) | 10 MW FPP (with emissions handling) |
|---|---|---|---|
| Emissions | | | |
| CO2 | 438 g/kWh | 370 g/kWh | 39 g/kWh |
| Nox | 250 mg | 250 mg | 25 mg |
| Approx. efficiency | 42% | 51% | 51.50% |

Of particular note is the overall efficiencies of the systems. A standard 10 MW peaker plant has an efficiency of about 42%. FPP configuration of system 100 without the emissions handling has an efficiency of about 51%. With emissions handling, this efficiency rises still further to about 51.5%. Moreover, typically a standard peaker plant will run for about 1,500 hours per year. Because of the benefits of carbon capture, and the redundancy provided within the system (e.g. by running multiple combustion engines, and/or the ETC, low temperature turbine and high temperature turbine which can be turned on and off independently of each other), the system 100 can run for approximately 8,000 hours per year. This also helps mitigate inefficiencies caused by turning the system on and off. Therefore, it will be appreciated that the components of the system operate synergistically to improve overall efficiency.

From the foregoing it will be appreciated that a new plant configuration is provided that: increases the efficiency of a reciprocating gas engine power plant; removes carbon and NOx from the resultant emissions; and purifies these emissions to produce valuable industrial gases such as $CO_2$.

According to examples, the combustion engine 102 acts as the base from which the other technologies (e.g. ETC, HT ORC, LT ORC) operate. However, the at least one combustion engine 102 remains inherently independent from the ETC, HT ORC and LT ORC, thereby limiting operational risk. If one of the downstream elements (e.g. ETC, HT ORC, LT ORC) requires maintenance, this can be turned off individually while allowing the plant to continue to generate to fulfil its contractual commitments. In examples, the downstream elements rely on simple inputs from the engine 102 to start, and in some examples will do so automatically when the correct input levels are reached. In some examples, the downstream elements require only field instrument inputs to start and stop. According to some examples, this can be automatically controlled by the control system 170.

According to some examples, each of the ET ORC, HT ORC, LT ORC may be considered a heat recovery unit. Collectively, the ET ORC, HT ORC and LT ORC may be considered a heat recovery arrangement. In some examples, a specific way in which exhaust heat is fed from each of the combustion engine(s) to the heat recovery arrangement is not limited. For example, heat from one or more combustion engines may be accumulated before being fed to the heat recovery unit, where it is then split between each heat recovery unit. In some examples, where there are two or more combustion engines, then one combustion engine may feed one or more of the heat recovery units whilst another combustion engine feeds another of the one or more heat recovery units. In some examples, and as previously mentioned, each of the heat recovery units can be turned off whilst the other units keep operating. For example, it is possible to feed one LT ORC from two engines, and if one of the two engines is down, the LT and HT ORC can operate at half load and flue gas can be fed to the CCU at half rate.

According to some examples, the system 100 is controlled by a control system 170. According to some examples, the control system 170 comprises at least one memory 172 and at least one processor 174. According to some examples, control software is stored in memory 172. According to examples, control system 170 comprises a controller. The control system is arranged to control elements of system 100, such as when elements (e.g. at least one combustion engine 102; ETC 112; HT ORC 114; LT ORC 116) are turned off and on. According to some examples, system 100 can run automatically according to the control software. According to some examples, the control system 170 comprises a user interface enabling an operator to control elements of the system 100.

The disclosed system can be implemented on new build sites. In some examples, the system or elements of the system can be retrofitted to existing plants that are looking to adapt to comply with increasingly demanding environmental standards, market changes and regulations.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A power generation system comprising:

at least one combustion engine comprising a power generation arrangement, the power generation arrangement constructed and arranged to generate electricity from waste energy from the at least one combustion engine; the power generation arrangement comprising an electro-turbo compounding engine, a high temperature turbine engine, and a low temperature turbine engine; and an emissions unit for handling emissions from the system, the emissions unit comprising a carbon capture unit; wherein the emissions unit comprises:

an accumulator that is constructed and arranged to homogenize flue gases received at the accumulator, and an induced draught fan to draw the homogenized flue gases away from the accumulator.

2. The power generation system according to claim 1, wherein each of the electro-turbo compounding engine; the high temperature turbine engine; and the low temperature turbine engine can be switched on and off independently of each other.

3. The power generation system according to claim 1, wherein the electro-turbo compounding engine is constructed and arranged to be driven by kinetic and/or thermal energy from the at least one combustion engine.

4. The power generation system according to claim 1, wherein the high temperature turbine engine is constructed and arranged to be driven by flue gas from the at least one combustion engine.

5. The power generation system according to claim 4, further comprising a heat exchanger fluidly connected to the high temperature turbine engine, wherein the flue gas enters the heat exchanger at about 380° C.

6. The power generation system according to claim 1, wherein the low temperature turbine engine is constructed and arranged to be driven by water heated from the at least one combustion engine, the water entering the low temperature turbine engine at about 90° C. to 120° C.

7. The power generation system according to claim 1, wherein the at least one combustion engine comprises two combustion engines.

8. The power generation system according to claim 7, wherein at any one time, at least one of the two or more combustion engines is switched off and at least one of the two combustion engines is switched on.

9. The power generation system according to claim 1, wherein the at least one combustion engine comprises four combustion engines, and at any one time at least one of the four combustion engines is switched on.

10. The power generation system according to claim 9, wherein at any one time three of the combustion engines are switched on and one of the combustion engines is switched off.

11. The power generation system according to claim 1, further comprising at least one electricity generator driven by the at least one combustion engine.

12. The power generation system according to claim 11, wherein an output shaft of the at least one combustion engine is operatively connected to both the electricity generator driven by the at least one combustion engine and one of: an input shaft of the electro-turbo compounding engine, or an input shaft of the high temperature turbine engine, or an input shaft of the low temperature turbine engine.

13. The power generation system according to claim 11, wherein an output shaft of the at least one combustion engine is operatively connected to both the electricity generator driven by the at least one combustion engine and an input shaft of the low temperature turbine engine.

14. The power generation system according to claim 13, further comprising a clutch for selectively transmitting drive from the output shaft of the at least one combustion engine to the input shaft of the low temperature turbine engine when an operating temperature of the low temperature turbine engine is reached.

15. The power generation system according to claim 1, further comprising: an electricity generator driven by the electro-turbo compounding engine; an electricity generator driven by the high temperature turbine engine; and an electricity generator driven by the low temperature turbine engine.

16. The power generation system according to claim 1, wherein the carbon capture unit is constructed and arranged to output food-grade carbon dioxide and/or carbon black.

17. The power generation system according to claim 1, wherein the emissions unit comprises a carbon-oxygen separation unit, the carbon-oxygen separation unit being constructed and arranged to:

receive below food-grade carbon dioxide from the carbon capture unit; and provide oxygen and carbon black as an output.

18. The power generation system according to claim 1, wherein the emissions unit comprises a NOx/SOx cleaner.

19. The power generation system according to claim 1, wherein the power generation system is arranged to output electrical power to an electrical grid.

* * * * *